US009964191B2

(12) United States Patent
Hochmuth et al.

(10) Patent No.: US 9,964,191 B2
(45) Date of Patent: May 8, 2018

(54) STEP-BY-STEP MECHANISM

(71) Applicant: Schaeffler Technologies AG & Co. KG, Herzogenaurach (DE)

(72) Inventors: Harald Hochmuth, Hagenbuchach (DE); Klaus-Peter Koneke, Hochstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 215 days.

(21) Appl. No.: 14/907,085

(22) PCT Filed: May 13, 2014

(86) PCT No.: PCT/DE2014/200207
§ 371 (c)(1),
(2) Date: Jan. 22, 2016

(87) PCT Pub. No.: WO2015/014350
PCT Pub. Date: Feb. 5, 2015

(65) Prior Publication Data
US 2016/0252169 A1     Sep. 1, 2016

(30) Foreign Application Priority Data
Aug. 1, 2013   (DE) .................. 10 2013 215 073

(51) Int. Cl.
| F16H 31/00 | (2006.01) |
| B60N 2/02 | (2006.01) |
| B60N 2/44 | (2006.01) |

(52) U.S. Cl.
CPC ............. *F16H 31/002* (2013.01); *B60N 2/02* (2013.01); *B60N 2/4445* (2013.01)

(58) Field of Classification Search
CPC ..... F16H 31/002; F16H 31/003; F16H 31/006; B60N 2/02; B60N 2/167; B60N 2/169; B60N 2/224; B60N 2/4445; F16D 41/088
See application file for complete search history.

(56) References Cited

U.S. PATENT DOCUMENTS 1,782,605  A  *  11/1930  Farley ................ F16D 15/00
                                                    192/44
1,899,834  A  *   2/1933  Thomas ............... F16D 41/088
                                                    192/44
(Continued)

FOREIGN PATENT DOCUMENTS

| CN | 1392934 | 1/2003 |
| CN | 101317022 | 12/2008 |

(Continued)

OTHER PUBLICATIONS

Machine translation of DE 102006026392 A1 obtained on Oct. 16, 2017.*

(Continued)

*Primary Examiner* — Adam D Rogers
(74) *Attorney, Agent, or Firm* — Volpe and Koenig, P.C.

(57) ABSTRACT

A step-by-step mechanism with a housing (2) in which an outer ring (3) and an output element (4) are disposed, the outer ring (3) including double-clamp ramps (6) and the output element (4) including an inner clamping track (7), and, in an annular space (8) formed between the outer ring (3) and the output element (4), clamping bodies (9) being disposed which cooperate with the double-clamp ramps (6), the clamping bodies (8) being spring-loaded. Provided in the housing (2) is a housing-fixed sleeve (10) and spring elements (13) that spring-load the clamping bodies (9) are supported on the sleeve (10).

6 Claims, 3 Drawing Sheets

(56) References Cited

U.S. PATENT DOCUMENTS

| | | | | |
|---|---|---|---|---|
| 6,212,965 B1* | 4/2001 | Hochmuth | ........... | B60N 2/2257 192/15 |
| 6,273,233 B1 | 8/2001 | Denis | | |
| 6,508,347 B1 | 1/2003 | Hochmuth | | |
| 6,568,759 B1* | 5/2003 | Hochmuth | ........... | B60N 2/2227 297/362 |
| 6,955,251 B2* | 10/2005 | Kurita | ................. | B60N 2/1615 192/19 |
| 8,051,967 B2* | 11/2011 | Hochmuth | ........... | B60N 2/444 192/15 |
| 8,348,344 B2* | 1/2013 | Richard | ................. | B60N 2/167 297/344.12 |
| 8,678,154 B2* | 3/2014 | Kim | ...................... | B60N 2/167 192/223.2 |
| 8,820,501 B2 | 9/2014 | Hur et al. | | |
| 9,051,978 B2* | 6/2015 | Karthaus | ................ | B60N 2/169 |
| 2003/0173182 A1 | 9/2003 | Kim | | |
| 2007/0137978 A1* | 6/2007 | Yamada | ............... | B60N 2/1615 192/223.2 |
| 2010/0258391 A1 | 10/2010 | Hochmuth | | |
| 2012/0112508 A1 | 5/2012 | Richard et al. | | |
| 2017/0253148 A1* | 9/2017 | Chae | .................... | B60N 2/1635 |

FOREIGN PATENT DOCUMENTS

| | | | | |
|---|---|---|---|---|
| DE | 19854945 | | 5/2000 | |
| DE | 10017850 | | 7/2004 | |
| DE | 102006026392 | | 12/2007 | |
| DE | 102013215869 A1 | * | 12/2014 | ............. B60N 2/167 |
| KR | 100956729 | | 4/2010 | |
| WO | WO-2006136234 A1 | * | 12/2006 | ........... B60N 2/2227 |
| WO | WO-2014020284 A1 | * | 2/2014 | ............. B60N 2/167 |

OTHER PUBLICATIONS

Machine translation of DE 102013215869 A1 obtained on Oct. 17, 2017.*

Machine translation of WO 2014020284 A1 obtained on Oct. 16, 2017.*

* cited by examiner

STEP-BY-STEP MECHANISM

FIELD OF THE INVENTION

The invention relates to a step-by-step mechanism, for example, a seat adjustment device.

BACKGROUND

Step-by-step mechanisms are usually constructed as clamping roller switching mechanisms and have continuously variable operation to enable adjustment, for example, of a motor vehicle seat. A drive element and a driven element together with facing clamping surfaces define wedge-shaped clamping gaps that taper in opposite directions and in which clamping rollers are arranged. If the drive element is moved out of its starting position or its home position, the drive element performs a work stroke. The return movement of the drive element into the starting position is an idle stroke in which the driven element is not actuated. In the work stroke of the drive element in one direction, the first clamping rollers are brought into clamping engagement with the clamping surfaces, wherein the other clamping rollers are supported fixed to the frame and remain out of clamping engagement with the clamping surfaces. During the idle stroke, the previously clamped clamping rollers are out of clamping engagement with the clamping surfaces due to the reverse movement, and the other clamping rollers also remain supported on the stop fixed on the frame and out of clamping engagement with the clamping surfaces during the idle stroke. Thus, the driven element is not carried along during the idle stroke.

If the step-by-step mechanism is not actuated, it is ensured that a torque introduced from the outside into the driven shaft of the step-by-step mechanism is introduced into a housing, preferably a housing fixed to the frame. In the case of the motor vehicle seat, the weight of the seat or spring forces and/or the weight of a person generate the torque acting on the driven shaft from the outside. The step-by-step mechanism thus prevents the seat height from being changed unintentionally.

DE 10 2006 026 392 A1 discloses a step-by-step mechanism that is formed as a clamping roller switching mechanism and has an outer ring that can be connected to a drive element and an inner ring acting as the driven element. Between the outer ring and the inner ring there are clamping bodies that interact with double clamp ramps on at least one of the rings. Concentric to the rings there are mutually adjustable spring carriers. The spring carriers are clamped relative to each other by means of a spring in order to spring-load the clamping bodies.

SUMMARY

The objective of the present invention is to provide a step-by-step mechanism that can be produced economically and is optimized with respect to installation space.

According to the invention, this object is achieved by a step-by-step mechanism with a housing in which an outer ring and a driven element are arranged, wherein the outer ring has double clamp ramps and the driven element has an inner clamping track and clamping bodies are arranged in an annular space formed between the outer ring and the driven element, which interact with the double clamp ramps and wherein the clamping bodies are spring-loaded, wherein, in the housing, a housing-fixed sleeve is provided and wherein spring elements that spring-load the clamping bodies are supported on the sleeve.

The double clamp ramps each form a left and a right clamping gap. In addition, in the area of each double clamp ramp there is a clamping body or a clamping body is allocated to each double clamp ramp. The clamping bodies are formed, for example, as clamping needles or clamping rollers.

In the step-by-step mechanism according to the invention, a housing-fixed sleeve is provided in the housing on which the spring elements are supported. The spring elements are used to spring-load the clamping bodies against the double clamp ramps. Through the use of a sleeve on which the spring elements are supported, the spring carrier known from the prior art can be eliminated. This has the advantage that axial installation space can be saved.

In one preferred construction of the invention, the clamping bodies are spring-loaded on two sides in the circumferential direction. To make possible a step-by-step mechanism that can be switched in two directions, the clamping bodies are spring-loaded in the circumferential direction from two sides, i.e., the clamping bodies are spring-loaded both in the clockwise direction and also in the counterclockwise direction. Depending on the direction in which the outer ring is moved, the clamping bodies are moved into the corresponding clamping gap. If, for example, the outer ring rotates in the clockwise direction, the clamping bodies are then pressed into the corresponding left clamping gap. If the step-by-step mechanism is in a home position, i.e., the outer ring is not rotating, the clamping bodies are spring-loaded against the double clamp ramps and are not in contact with the inner clamping track of the driven element.

Advantageously, the sleeve has axial cams on which the spring elements are supported. The axial cams here engage in the ring space formed by the outer ring and the driven element. This ensures that the spring elements can be reliably supported. Advantageously, the axial cams and the sleeve are formed integrally with each other. A spring element is supported on the axial cams in the clockwise direction and in the counterclockwise direction.

In another construction of the invention, the sleeve has a base that has an axially elastic construction and acts on the driven element. The base of the sleeve is constructed according to the principle of a plate spring. The base presses elastically on the driven element in order to prevent forward creep of the driven element (stick-slip effect). In this way, noises caused by the stick-slip effect can be reduced. In addition, through such an arrangement, an additional friction brake can be eliminated, which reduces the number of components and thus can save installation space.

According to a preferred construction of the invention, the driven element is formed as an inner ring. The driven element can be supported on a bearing pin. Because both the spring carrier and also an extra friction brake can be eliminated, the bearing pin can have a design with a larger diameter for supporting the driven element, which makes it possible to improve the bearing.

Advantageously, the sleeve is formed from a plastic. Through such a construction, it is possible to reduce the total weight of the step-by-step mechanism.

According to another construction of the invention, the spring elements are formed as compression springs.

Advantageously, a step-by-step mechanism is used in a seat adjustment device, wherein the outer ring is connected to a drive element of the seat adjustment device. Step-by-step mechanisms are used in vehicle seats to enable continuous seat adjustment, i.e., height adjustment and/or adjustment of a seatback. To limit the forces to be applied by the operator in a manual seat height adjustment device, the seat adjustment device is typically pre-tensioned by a spring that acts in the direction of a higher positioning of the seat. Thus, a spring force is applied permanently on the driven element of the seat adjustment device.

If the seat adjustment device and thus the step-by-step mechanism are not actuated, the drive element of the step-by-step mechanism remains in the fixed angular position based on the clamping rollers located in the clamping position. As soon as the seat adjustment device is actuated, however, i.e., a drive element is pivoted, the clamping bodies are forced out of their home position.

BRIEF DESCRIPTION OF THE DRAWINGS

An embodiment of the invention is described below with reference to three figures. Shown are.

DETAILED DESCRIPTION OF THE PREFERRED EMBODIMENTS

Figure 1:
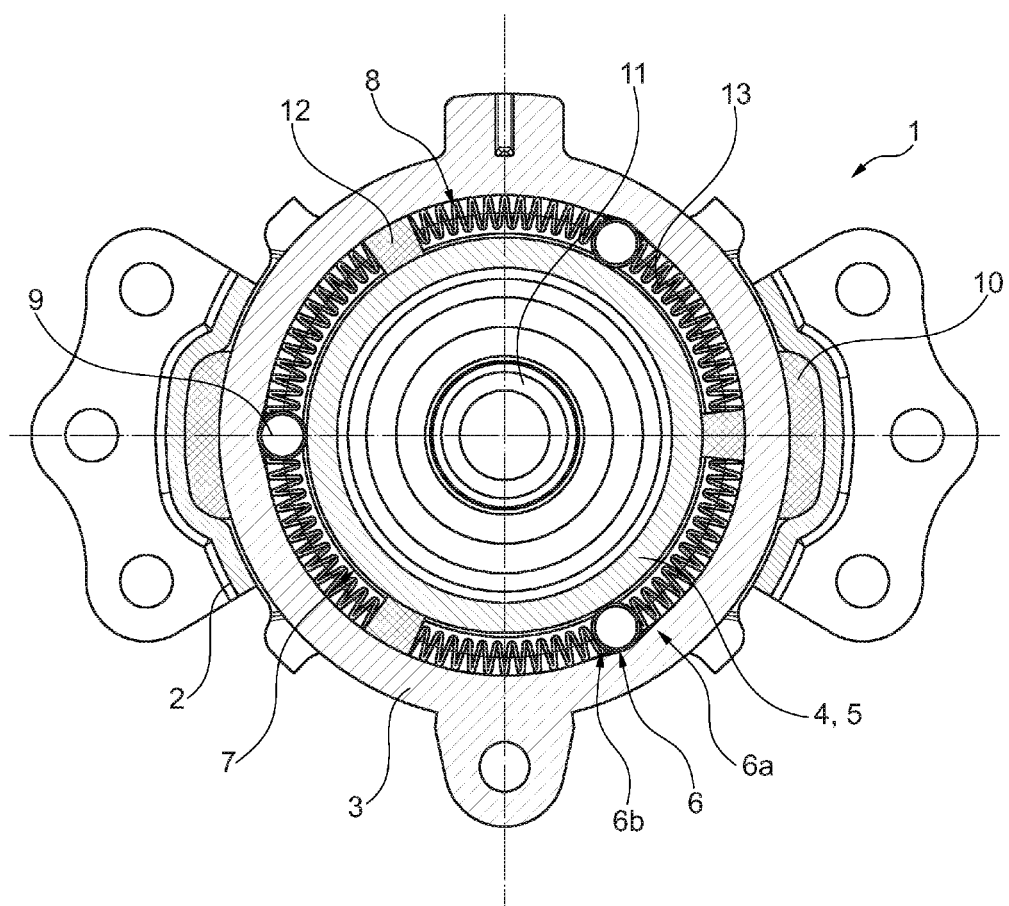
FIG. 1 a longitudinal section through a step-by-step mechanism according to the invention in its rest position, FIG. 2 a side view of the step-by-step mechanism according to the invention, and FIG. 3 a longitudinal section through a step-by-step mechanism according to the invention in the adjustment mode.
Figure 2:
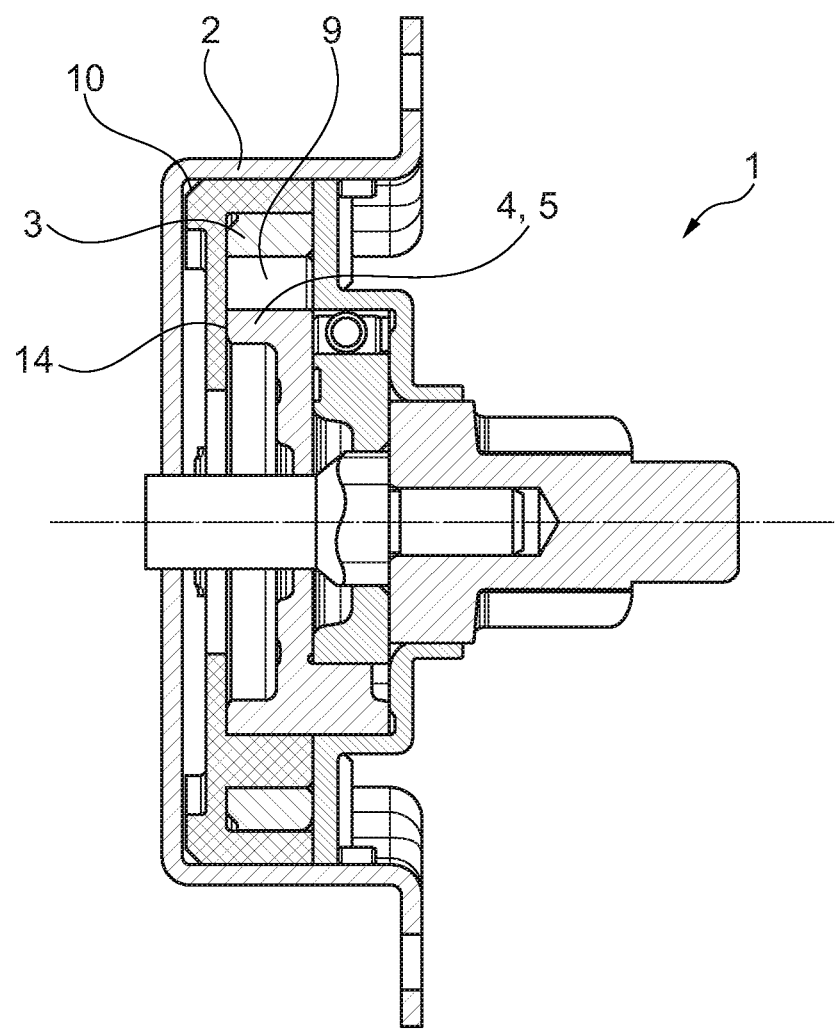
Figure 3:
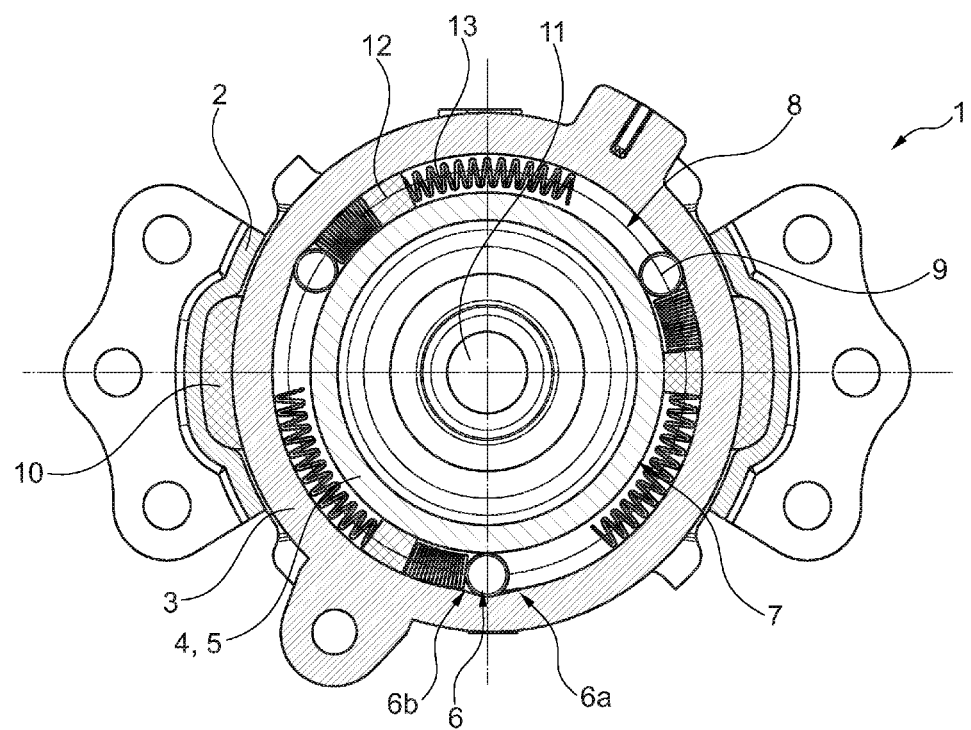

FIGS. 1 to 3 show the step-by-step mechanism 1 according to the invention. The step-by-step mechanism 1 comprises a housing 2 in which an outer ring 3 and a driven element 4 that is formed as an inner ring 5 are arranged.

The outer ring 3 has double clamp ramps 6 that form a left clamping gap 6a and a right clamping gap 6b. The driven element 4 has an inner clamping track 7 and is supported on a bearing pin 11. The outer ring 3 and the driven element 4 form a ring space 8 in which clamping bodies 9 are provided. The clamping bodies 9 interact with the double clamp ramps 6.

In the housing 2 there is a housing-fixed sleeve 10 that is formed from a plastic. The sleeve 10 has cams 12 formed in the axial direction. The cams 12 engage in the ring space 8. Spring elements 13 that spring-load the clamping bodies 9 against the double clamp ramps 6 are supported on the cams. On the cams 12, in the circumferential direction, a spring element 13 is supported in the clockwise direction and a spring element is supported in the counterclockwise direction. This means that the clamping bodies 9 are spring-loaded in the circumferential direction from two sides. The spring elements 13 are formed as compression springs.

In addition, the sleeve 10 has a base 14. The base 14 is elastic in the axial direction and acts on the driven element 4. The base 14 of the sleeve 10 is constructed according to the principle of a plate spring.

Below, the function of the step-by-step mechanism 1 according to the invention is explained with reference to FIGS. 1 and 3.

FIG. 1 shows the step-by-step mechanism 1 in a home position, i.e., the outer ring 3 is not rotating. As can be seen, the clamping bodies 9 are spring-loaded by means of the spring elements 13 against the double clamping ramps 6 such that these are not in contact with the inner clamping track 7. Each spring element 13 acts with the same force on the clamping bodies 9.

FIG. 3 shows the step-by-step mechanism 1 in an adjustment position, i.e., the outer ring 3 is rotating. In the shown embodiment, the outer ring 3 is rotated in the clockwise direction. Consequently, the clamping bodies 9 are pressed by means of the corresponding spring element 13 into the left clamping gap 6a. The clamping bodies 9 are in contact with the outer ring 3 and with the inner clamping track 7 of the driven element 4, wherein the driven element 4 can be carried along. If the outer ring 3 does not rotate, the clamping bodies 9 are moved back into the home position corresponding to FIG. 1.

As an alternative, the outer ring 3 can also rotate in the counterclockwise direction. The clamping bodies 9 are pressed accordingly into the right clamping gap 6b.

Because the base 14 is pressed elastically on the driven element, forward creep of the driven element 4 is prevented.

LIST OF REFERENCE NUMBERS

1 Step-by-step mechanism
2 Housing
3 Outer ring
4 Driven element
5 Inner ring
6 Double clamp ramps
6a Left clamping gap
6b Right clamping gap
7 Inner clamping track
8 Ring space
9 Clamping bodies
10 Sleeve
11 Bearing pin
12 Cam
13 Spring element
14 Base

The invention claimed is:

1. A step-by-step mechanism comprising a housing, an outer ring and a driven element arranged in the housing, the outer ring has clamp ramps forming a left clamping gap and a right clamping gap, and the driven element has an inner clamping track, clamping bodies arranged in a ring space formed between the outer ring and the driven element, said clamping bodies interact with the clamp ramps and are spring-loaded, a housing-fixed sleeve in the housing, the sleeve including:
 (a) a base that is elastic in an axial direction,
 (b) a radially outer portion including a first axial protrusion that surrounds the outer ring, and
 (c) axial cams positioned radially inwardly from the first axial protrusion that axially project into the ring space, the base extends cantilevered radially inwardly from the axial cams and provides an axial support surface for the driven element, and spring elements that spring-load the clamping bodies are supported against the axial cams.

2. The step-by-step mechanism according to claim 1, wherein the clamping bodies are spring-loaded in a circumferential direction on two sides.

3. The step-by-step mechanism according to claim 1, wherein the driven element is constructed as an inner ring.

4. The step-by-step mechanism according to claim 1, wherein the sleeve is constructed from a plastic.

5. The step-by-step mechanism according to claim 1, wherein the spring elements are compression springs.

6. A seat adjustment device with a step-by-step mechanism according to claim 1, wherein the outer ring is connected to a drive element of a seat adjustment device.

\* \* \* \* \*